Dec. 29, 1970 RYO IGARASHI 3,551,899

ASSOCIATIVE MEMORY EMPLOYING BISTABLE CIRCUITS AS MEMORY CELLS

Filed Nov. 28, 1967 4 Sheets-Sheet 1

INVENTOR.
RYO IGARASHI

BY

OSTROLENK, FABER, GERB & SOFFEN

ATTORNEYS

ASSOCIATIVE MEMORY EMPLOYING BISTABLE CIRCUITS AS MEMORY CELLS

Filed Nov. 28, 1967 4 Sheets-Sheet 2

INVENTOR.
RYO IGARASHI

BY
OSTROLENK, FABER, GERB & SOFFEN
ATTORNEYS

ASSOCIATIVE MEMORY EMPLOYING BISTABLE CIRCUITS AS MEMORY CELLS

Filed Nov. 28, 1967

INVENTOR.
RYO IGARASHI
BY
OSTROLENK, FABER, GERB & SOFFEN
ATTORNEYS

INVENTOR.
RYO IGARASHI
BY
OSTROLENK, FABER, GERB & SOFFEN
ATTORNEYS

United States Patent Office 3,551,899
Patented Dec. 29, 1970

3,551,899
ASSOCIATIVE MEMORY EMPLOYING BISTABLE CIRCUITS AS MEMORY CELLS

Ryo Igarashi, Tokyo, Japan, assignor to Nippon Electric Company Limited, Tokyo, Japan Filed Nov. 28, 1967, Ser. No. 686,052
Int. Cl. G11c *11/40*; H03k *3/286*
U.S. Cl. 340—173 7 Claims

ABSTRACT OF THE DISCLOSURE

An associative memory in which memory cells of the bistable type and preferably employing FET transistors are arranged to form word groups wherein the words are arranged in regular rows and columns in a matrix fashion. An interrogation signal source is provided in common to all the columns and a plurality of word driving circuits are respectively connected to the rows of the matrix through a first group of logic circuits. A second group of logic circuits detects the presence of a match in any row between the interrogation signals and the associated digit positions of the row. A selection circuit causes sequential readout of all rows having a match of at least one word with the interrogation signals, and further logic circuitry is employed to cause readout of only those words in a row which match and cause suppression of those remaining words in the row in which a mismatch occurs between interrogation signals and such remaining words.

The instant invention relates to memory storage devices and more particularly to memory storage devices employing bistable memory cells which comprise an associative memory capable of reading out a plurality of words stored in memory as a result of interrogation by a single interrogation signal group wherein the digit positions of all words read out from memory compare favorably with the associated digit positions of the interrogation signals.

There exist many applications of digital computer and data processing systems wherein it is highly desirable to be able to detect the presence of those words amongst a multitude of words stored in a memory that have selected portions thereof that match with an interrogation signal. Such an operation can be carried out by interrogating the selected words on the basis of their stored contents and not on the basis of their address or location in memory. Those words whose selected portions match the interrogation signal are thus read out of memory. The above operation is normally achieved through the use of what is conventionally referred to as an associative memory. In associative memory devices a comparison is performed between the portions selected from among a multitude of words in memory and an interrogation signal. Matching signals are generated to indicate the presence of those words whose selected portions compare favorably with the interrogation signal. Any mismatch of those words in memory with the interrogation signal obviously prevents generation of matching signals. However, when two or more words stored in the associative memory have selected portions which match the interrogation signal, it is desirable to provide sequential readout of the respective matching stored contents.

One associative memory of this type is described in the 1966 International Solid-State Circuit Conference Digest of Technical Papers appearing on pages 118 through 119. The associative memory described in the above mentioned article generates matching signals of the type described hereinafter and further provides a storage means such as, for example, a flip-flop circuit for each word to store the matching signal. This arrangement causes the disposal circuitry, which performs the function of sequential readout of matching words when two or more words are simultaneously found to match the interrogation signals, to be quite complex in both design and operation, thereby making it difficult to provide high-speed operation of the memory. In addition thereto, the associative memory proposed in the above mentioned technical article requires a separate circuit for generating the selective signals for each word of the memory rendering the cost of such memory almost prohibitive.

The present invention is characterized by providing an associative memory in which the defects of slow operating speed, complex design and prohibitive costs are substantially eliminated.

The present invention is comprised of a plurality of memory cells each preferably constituted of MOS transistors arranged to form a bistable circuit and being capable of being operated to perform both conventional write-in and readout functions, as well as performing the associative readout function.

The memory cells are arranged in groups with each group constituting a word. The words are arranged in regular rows and columns, arranged in an ordered matrix fashion of M rows and N columns so that each of the N columns contain one digit position of each of the M words.

In the performance of an interrogation operation, interrogation signals representing selected digit positions of the word are simultaneously impressed upon the associated digit positions of all words in memory through the application of interrogation signals to driving circuits associated with each column of the memory.

Those words, regardless of their position in the memory, whose digit positions compare favorably with the interrogation signals each generate a matching signal which is applied to a disposal circuit for applying the words of each row in sequential fashion to a comparison circuit which again compares the words in the row coupled to the comparison circuit with the interrogation signals so as to read out from memory only those words in the row whose digit positions compare favorably with the interrogation signals. Sequential readout continues until the last row of words in memory generating a matching signal undergoes the second comparison operation which permits readout of those words comparing favorably and suppresses readout when a mismatch between a word and the interrogation signals is present.

It is therefore one object of the present invention to provide a novel associative memory having a capability of simultaneously interrogating all words in memory and successively reading out all words which match the interrogation signals wherein all matching words in a row are read out in parallel and wherein the memory rows are read out in succession.

Another object of the instant invention is to provide a novel associative memory capable of performing all conventional memory operations of write-in and readout, as well as associative interrogation.

Still another object of the present invention is to provide a novel associative memory system in which two or more words in memory may be readout simultaneously as the result of performing an associative interrogation operation to thereby measurably reduce the readout time and hence operating speed of the memory.

Still another object of the present invention is to provide a novel associative memory for use in computers, data processers and like systems and employing a novel disposal circuit for use in ascertaining those rows in memory which have generated a matching signal for at least one word of the row and for further reading out each row in succession so as to pass those words in matching interrogation signals to an output utilization means.

These as well as other objects of the instant invention will become apparent when reading the accompanying description and drawings in which.

Figure 1:
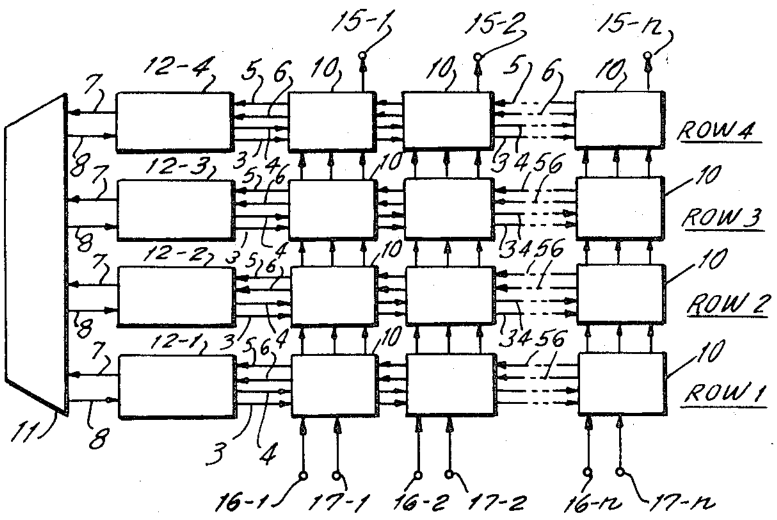
FIG. 1 is a block diagram of an associative memory employing conventional techniques.

As an aid toward the better understanding of the present invention and its advantages, a brief description will first be given of the conventional associative memory device. One such state of the art system is shown in FIG. 1. The memory is comprised of a plurality of associative memory cells 10 each capable of storing a single binary bit. The cells 10 are arranged in *m* rows and *n* columns wherein the *n* memory cells provided in each row constitute a single word. For example, the row 1 (lowermost row) contains a *n* bit word comprised of the *n* memory cells 10 contained within row 1.

Each of the rows is provided with a circuit 12–1 through 12–4, respectively, which is a logical circuit, including a selective signal generating circuit and a flip-flop circuit used for storing a match signal. The logical circuits 12 are each coupled to a multi-match disposal circuit 11 for enabling the readout of each word in memory in a sequential manner. The sets of terminals 16–1 through **16–*n* and 15–1 through 15–*n*** are employed as output terminals for reading data out of the selected words, in a manner to be more fully described.

The operation of the associative memory shown in FIG. 1 is as follows:

Interrogation signals are applied to selected ones of the terminals 16-1 through **16–*n* and 17–1 through 17–*n* causing the stored contents of those selected input terminals receiving signals to be compared with the applied interrogation signals. The results of the comparison are transferred through the leads 5 and 6 provided for each word to the logical circuits 12–1 through 12–4 provided for each word. When the interrogation signal and the stored content of a word match, a flip-flop circuit—which is contained in the logic circuit 12 provided for that word—used for storing the match signal of the word, is driven to its set state. When two or more flip-flops contained in their respective logic circuits 12 are in the set state, i.e., when there are two or more words which match with the interrogation signal, the outputs of the flip-flops used for storing the matched conditions applied to each circuit 12, in turn apply these match signals to the multi-match disposal circuit 11 through leads 7**.

The disposal circuit 11 emits a selective signal to one on the logical circuits 12 through an associated output lead 8 in order to select the match words or read out in a sequence from word one through to word four. During the readout or disposal operation, no selective signal is emitted to those words for which a mis-match is present. When a selective signal is emitted to one of the logical circuits 12, the output of the activated logical circuit is applied to the *n* cells 10 in the associative memory which are connected with the logical circuit 12 through leads 3 and 4 thereby selecting the word corresponding to logical circuit 12. Leads 3 and 4 transfer the output of the logical circuit 12 to the *n* memory cells of the word and are used for readout and write-in. Thus, when a word selection is performed through lead 4 to read the stored contents of the selected word, the stored contents of the selected word is read out and the digit positions appear at each of the terminals 15–1 through **15–*n***.

As is obvious from the foregoing description, a flip-flop circuit is required for storing the match condition for each word in the associative memory. Since the multi-match disposal circuit which examines all of the flip-flops of logical circuits 12 to determine which are in the set state and read out the words in sequential fashion, an associative memory of conventional design has the distinct disadvantages of requiring a disposal circuit which is quite complicated in design and which further prevents high-speed operation due to the fact that all words are read out in a sequential manner.

Figure 2:
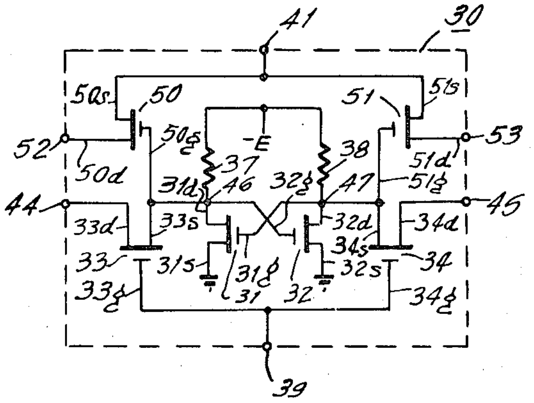
FIG. 2 is a schematic diagram of an associative memory cell for use in a preferred embodiment of the present invention.

Considering the associative memory of the present invention, FIG. 2 is a schematic diagram showing a memory cell of the type which may be employed in the novel associative memory of the present invention. The cell 30, shown in FIG. 2, is comprised of a plurality of MOS transistors for providing both gating and storing functions. Storage of a bistable state is provided through the transistors 31 and 32 having their source electrodes **31*s* and 32*s* grounded; having their drain electrodes 31*d* and 32*d* cross-coupled with the gate electrodes 32*g* and 31*g*, respectively; and further having their drain electrodes coupled to terminals 46 and 47 of resistors 37 and 38**, respectively, whose opposite terminals are connected in common to a bias supply −E.

MOS transistor 33 has its drain, source and gate electrodes **33*d*, 33*s* and 33*g*, respectively, connected to terminal 44, the node 46, and terminal 39. MOS transistor 34 is connected in a like manner with its drain, source and gate electrodes 34*d*, 34*s* and 34*g*, respectively connected to a terminal 45, node 47 and terminal 39. MOS transistor 50 has its drain, source and gate electrodes 50*d*, 50*s* and 50*g*, respectively connected to a terminal 52, a terminal 41 and node 46. In a like manner, MOS transistor 51 has its drain, source and gate electrodes, respectively connected to a terminal 53, terminal 41 and node 47**.

In the associative memory cell 30, terminals 52 and 53, respectively receive "1" and "0" interrogation signals during the performance of an interrogation operation. Terminal 44 is employed to receive "1" write-in and to generate "1" readout signals. Terminal 45 receives "0" write-in and generates "0" readout signals. Terminal 39 receives selective signals to place the associative memory cell 30 into a selected state to permit performance of a write-in or readout operation. Terminal 41 generates a match signal in those cases where a comparison exists between the interrogation signal and the stored contents of associative memory cell 30. A memory cell of this type is described in detail in copending application, Ser. No. 644,382, filed Aug. 30, 1967 and assigned to the assignee of the present invention. This memory cell design constitutes a novel improvement over another memory cell arrangement set forth in detail in copending application, Ser. No. 602,726, filed Dec. 19, 1966. Whereas detailed descriptions are set forth in the above mentioned applications, the following description of the memory cell 30 is offered herein for purposes of understanding the memory system of the present invention.

Let it be assumed that the storage of a binary "1" information state is represented by having the MOS transistors 31 and 32, respectively in the ON (conductive) state and OFF (nonconductive) state. Conversely, a binary "0" information state exists when the MOS transistors 31 and 32 are respectively OFF and ON. The normal state of the memory cell, i.e. the state when neither interrogation nor write-in, nor readout are being performed, exists when the voltages at the terminals 39, 41, 52 and 53 are at zero volts and when the voltages at terminals 44, and 45 are held at the −10 volt level. It will further be assumed that all of the MOS transistors in memory cell 30 have threshold voltages of approximately −5 volts. This state will be defined as one in which a constant voltage is applied between the source and drain electrodes so that the drain is maintained at a negative potential relative to the source and wherein a potential which is negative relative to the source is applied to the gate electrode. If the absolute value of the negative potential applied to the gate is increased (in other words, if the gate voltage level is made more negative) then an increase in the absolute value of the negative potential below the threshold voltage level will cause a current to flow between the source and drain electrodes. The values of resistors 37 and 38 and the value of the D.C. potential level −E are selected so that the potentials at nodes 46 and 47 will be approximately zero volts and approximately the D.C. potential when the bistable circuit is in a binary "1" stored state. With the bistable circuit in a binary "0" state the potential at node 46 is merely equal to the D.C. potential while the potential at node 47 is approximately zero volts. In practical applications, the values of resistors 37 and 38 normally lie within a range from 10,000 to several million ohms while the voltage level of the D.C. potential (−E) is approximately −10 volts. −10 volts will be assumed to be the applied D.C. voltage for the convenience of understanding the ensuing description of operation. The MOS transistors 31–34 selected for the memory cell each have impedances between their drain and source electrodes which are quite small when the transistors are conductive relative to the values of resistors 37 and 38.

The interrogation of a memory cell will now be considered:

Initially the potential at one of the terminals 52 or 53 is abruptly changed from zero volts (i.e. the normal state) to a negative value. In the performance of a "1" interrogation, the potential at terminal 52 is made negative while the potential at terminal 53 is maintained at zero volts. Conversely, in the performance of a "0" interrogation, the potential at terminal 53 is driven to a negative level while the potential at terminal 52 is maintained at zero volts. When the associative memory cell 30 stores a binary "1" state and a "1" interrogation is performed, MOS transistor 31 is conductive to maintain node 46 at zero volts. Gate electrode **50*g* is thereby biased well above its threshold level preventing transistor 50 from conducing even though the potential at the drain electrode 50*d* is at a negative value. This means that no current flows into terminal 41** from an external circuit.

In a similar manner, when the associative memory cell 30 stores a binary "0" and a binary "0" interrogation is performed, the application of a negative potential to terminal 53 will not cause any current to flow from terminal 41 toward terminal 53 (through the MOS transistor 51) since transistor 32 is conductive, maintaining node 47 at zero volts which, in turn, holds gate **51*g*** well above the threshold level.

Let it now be assumed that the associative memory cell 30 stores a "0" state and a binary "1" interrogation is performed. Transistor 31 is now in cut-off causing node 46 to be at approximately −10 volts. This level is applied to the gate of MOS transistor 50 to establish a current path through the transistor. When the potential at terminal 52 is abruptly changed to a negative value, a current flows from an external circuit into and through terminal 41 and transistor 50 to terminal 52. Similarly, when the associative memory cell stores a binary "1" state and a binary "0" interrogation is performed, a current will flow from an external circuit through terminal 41 and transistor 51 to terminal 53 due to the negative voltage level at node 47 applied to gate **51*g* which turns ON transistor 51. Summarizing the above descriptions, when there is a mis-match between the interrogation signal and the stored contents of the associative memory cell 30, a current is caused to flow into terminal 41 from an external circuit; however, in the case of a match between the stored state and the interrogation signal, no current flows in either direction through terminal 41**.

The write-in operation will now be considered. Let it be assumed that it is desired to write-in a binary "1" state at a time when the associative memory cell is in the binary "0" state. The memory cell is driven from its normal state by varying the potential at terminal 39 from the zero volt level to the −15 volt level through the application of a selective signal. Simultaneously therewith, the potential level at terminal 44 is abruptly changed from −10 volts to −4 volts while the potential level at terminal 45 remains at −10 volts. Since both transistors 33 and 34 are rendered conductive, nodes 46 and 47 are driven to −4 volts and −10 volts, respectively. The −4 volt level at node 46 is applied to gate **32*g* switching MOS transistor 32 from the ON to the OFF state. With transistor 32 OFF, the potential level at node 47 is maintained at −10 volts, which level is applied to gate 31*g* of transistor 31, fully turning this transistor ON and causing the potential at node 46 to go from −4 volts to approximately zero volts. No further change occurs in the OFF state of transistor 32 and the ON state of transistor 31 and the memory cell is thereby forced into a "1" storage state, which state will be maintained indefinitely, pending a subsequent write-in operation. The potential at terminal 39 is then returned from the −15 volt level to the zero volt level while the potential at terminal 44** is returned from the −4 volt to the −10 volt level to maintain the binary "1" storage state.

In the case where the associative memory cell 30 stores a binary "1" state and a binary "1" write-in operation is performed, the potential at node 46 is altered from zero volts to −4 volts as a result of the application of −4 volts to terminal 44 and the turn-ON of transistor 33. However, MOS transistor 32, which is already OFF experiences no change in its state and a bistable circuit is maintained in the binary "1" storage state. A binary "0" write-in operation is performed by abruptly changing the potential level at terminal 39 from zero volts to approximately −15 volts and simultaneously therewith by changing the potential at terminal 45 from −10 volts to −4 volts. In a manner substantially similar to that described above, the −4 volt level is applied to gate **31*g* causing transistor 31 to be turned OFF,, whereby node 46 goes to −10 volts which, in turn, is applied to gate 32*g* turning transistor 32** ON so as to store a binary "0" state.

To perform a readout operation the potential at terminal 39 is changed from its normal state (zero volts) to a −15 volt level, while the potentials at terminals 44 and 45 are respectively maintained at −10 volts. At this time, with the associative memory cell storing a binary "1," transistor 33 will conduct, causing a current to flow from the memory cell toward terminal 44 and an external circuit (not shown) through transistors 31 and 33. Simultaneously therewith, the potential at the source electrode **34*s* of transistor 34 is maintained at the potential level of node 47 which is −10 volts. Since node 47 and terminal 45 are both at −10 volts, MOS transistor 34 is in the OFF state. Similarly, when the associative memory cell 30 stores a binary "0" state, MOS transistor 34 will be conductive, causing a current to flow toward terminal 45 through transistors 32 and 34. At this time, the potential levels at terminals 44 and node 46 will be at −10 volts, rendering transistor 33** non-conductive.

One important aspect of the memory cell circuit should be considered during the readout operation. The potential at node 46 undergoes a change in potential level (from zero volts to a negative value) due to the conduction of transistor 33. In order to avoid a change in the OFF state of transistor 32, the potential values applied to the gates of MOS transistors 31 and 33 are selected in accordance with the respective electrical characteristics, namely, with regard to their mutual conductances. In other words, the relationship between the electrical characteristics of MOS transistors 31 and 33 and the potentials applied thereto is arranged so that the voltage drop between the source and drain electrodes 31*s* and 31*d* will not exceed the threshold voltage during a binary "1" readout operation. Since the above relationship is also applicable to MOS transistors 32 and 34, the readout operation will thereby be carried out without destruction of the stored contents, i.e. non-destructive readout will be performed.

Figure 3:
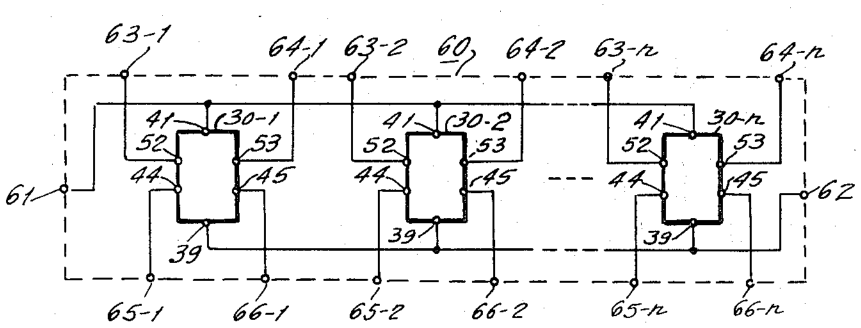
FIG. 3 is a simplified schematic diagram showing the construction of a memory word comprising *n* associative memory cells which may be of the type shown in FIG. 2 and the manner in which they are connected.

FIG. 3 illustrates one preferred embodiment of a single word arrangement which is comprised of *n* associative memory cells 30–1 through **30–*n* which are interconnected in a manner to be described hereinbelow. The circuitry of each associative memory cell 30**, shown primarily as a "black box" has been omitted herein for purposes of clarity, it being understood that the circuit configuration for each memory cell is as shown in FIG. 2. Only the terminals of each memory cell and the manner of their connection to external leads are shown in the figure and like terminals have been designated by like numerals as compared with FIG. 2.

The memory cells 30 each have their match (or mismatch) generating terminals 41 connected to a common bus which, in turn, is coupled to terminal 61. The selective signal receiving terminals 39 are all connected in common to a bus which, in turn, is coupled to terminal 62. The interrogation receiving terminals 52 are each coupled to an associated terminal 63–1 through **63–*n*; the complementary interrogation signal receiving terminals 53 are each coupled through a lead to terminals 64–1 through 64–*n*, respectively; and the write-in and readout terminals 44 and 45, respectively, are connected to associated terminals 65–1 through 65–*n* and 66–1 through 66–*n***, respectively.

Terminals 63 and 64 are employed for the application of interrogation signals; terminals 65 and 66 receive write-in signals or selectively generate readout signals; terminals 61 detects the match state between interrogation signals and stored contents of the memory cells 30 comprising word 60; and terminal 62 receives the selective signal which places all memory cells into the selective state during either write-in or readout operations. As was the case for a single memory cell, a memory word 60 comprised of *n* memory cells is maintained in a normal state by maintaining the potential at terminals 61, 62, 63–1 through **63–*n* and 64–1 through 64–*n* at zero volts and maintaining terminals 65–1 through 65–*n* and 66–1 through 66–*n*** at −10 volts.

Let it be assumed that cells 30–1 and 30–2 respectively store a binary "0" and a binary "1" state and that a binary "1" interrogation operation is to be performed on memory cells 30–1 and 30–2. Terminals 63–1 and 63–2 are thereby abruptly changed to negative potential levels. Referring to the interrogation operations previously described with respect to FIG. 2, it will be noted that a current will flow from terminal 61 toward terminal 41 of cell 30–1 as a result of a mis-match between the stored contents of cell 30–1 (binary "0") and the binary "1" interrogation signal. Since a match exists between the stored contents of associative memory cell 30–2 (binary "1") and the interrogation signal, no current flows from terminal 61 toward terminal 41. Since no interrogation signals have been applied to associative memory cells 30–3 through **30–*n*, no current will flow from terminal 61 toward the respective terminals 41 of the memory cells 30–3 through 30–*n***. However, a mis-match condition is nevertheless detected although only one single memory cell has its stored contents mis-matched relative to the interrogation signal applied thereto. Obviously, the interrogation operation may be performed on as many or as few of the bit positions of a word as is either desired or required. The absence of a mis-match signal on any of the memory cell positions causes that memory cell to operate as though a match occurred or, in other words, causes that memory cell to be ineffective in determining the existence of a match between external interrogation signals and the stored contents or selected positions thereof.

As a further example, let it be assumed that the stored contents of cells 30–1 and 30–2 are "0" and "1" respectively, and that "0" and "1" interrogation signals respectively, are applied to these memory cells. Making reference to the interrogation operation, the memory cell shown in FIG. 2 will be seen that no current will flow from terminal 61 toward either of the terminals 41 of cells 30–1 and 30–2. Likewise, the cells 30–3 through **30–*n* which do not receive interrogation signals, do not cause a current to flow from terminal 61 toward their associated terminals 41 and the absence of any current flow from terminal 61 toward the terminals 41 of any memory cell indicates a match between interrogation signals and the stored contents of associated memory cells. In summary, regardless of the number of memory cells interrogated, if a current flows from terminal 61 toward terminal 41 from any one or more of the memory cells 30, a mis-match condition is detected whereas the absence of any such current flow indicates that a matching condition exists between the interrogation signals and the associated memory cells which have been interrogated. For the sake of convenience in describing the present invention, even though no current flows during a matching condition, it will be assumed that a "matching signal" is obtained at terminal 61** during a matching condition.

Figure 4:
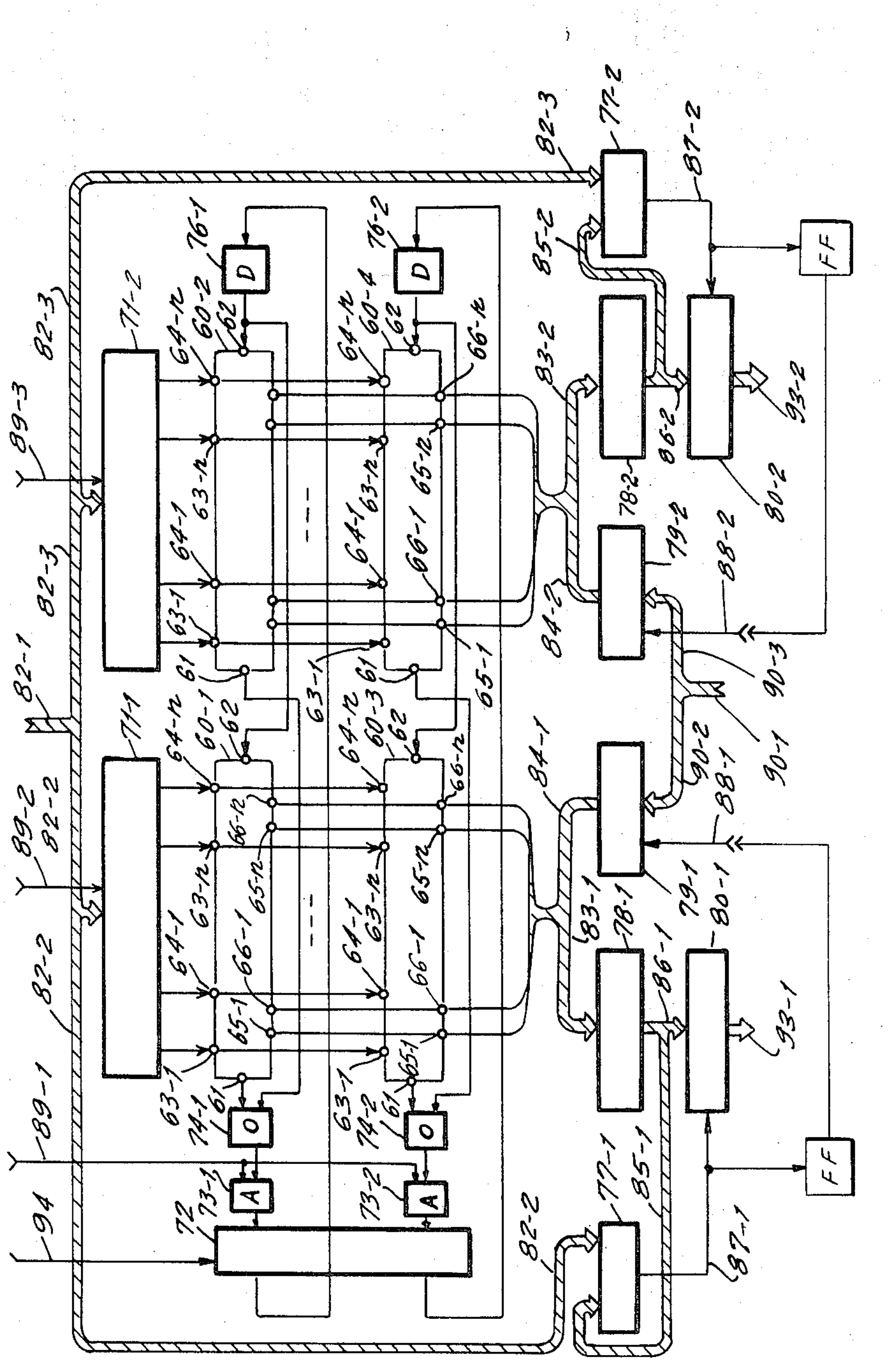
FIG. 4 is a block diagram showing one preferred embodiment of an associative memory employing the principles of the present invention.

FIG. 4 shows one preferred embodiment of an associative memory containing four memory words 60–1 through 60–4 arranged in the manner shown in FIG. 3 with the individual memory cells comprising each word being of the type shown in FIG. 2. Details of each word in memory have been omitted therefore, for purposes of simplicity.

The memory words 60–1 through 60–4 are arranged in a matrix fashion such that words 60–1 and 60–3 are in a first column; words 60–2 and 60–4 are in a second column; words 60–1 and 60–2 are in a first row; and words 60–3 and 60–4 are in a second row. Whereas the memory of FIG. 4 contains four words arranged in a two by two matrix, it should be understood that an appreciably larger matrix may be employed, if desired, and having N columns and M rows. The enlargement of the number of rows and columns in memory may be easily and readily performed while maintaining the concepts and circuitry of the instant invention and therefore the increase in capacity of the memory is well within the purview of the concepts described herein, as will be more fully described.

A brief identifying description of the elements comprising the memory system will first be given before description of the memory and its operation is set forth. The memory system of FIG. 4 is further comprised of write-in circuits 79–1 and 79–2 for writing in data into the word positions in memory. Circuit 79–1 services the left-hand column, while circuit 79–2 services the right-hand column. Bus lines 90–1 through 90–3 apply the appropriate data to the write-in circuits 79. It should be understood that the leads with which these numerals identify represent a large plurality of conductors although the representation appears to indicate only a single lead. Control leads 88–1 and 88–2 apply signals to the circuits 79–1 and 79–2, respectively, to control the type of operation performed (i.e. write-in or readout). Driving circuits 71–1 and 71–2 are employed to apply the interrogation signals to selected memory cells. The bus lines 82–1 through 82–3 apply interrogation signals to the driving circuits 71–1 and 71–2 which are provided for the left-hand and right-hand columns, respectively. OR gates 74–1 and 74–2 respectively provided for each row, combine the matched (mis-match) signals obtained from the words of their associated row at the time of an interrogation operation. The outputs of these OR gates are applied to associated input terminals of AND gates 73–1 and 73–2 which produce an output which is the logical product of the output of its associated OR gate and a control signal received through lead 89–1 which together with leads 89–2 and 89–3 control the performance of an interrogation operation. Signals applied at leads 89–2 and 89–3 control circuits 71–1 and 71–2, respectively, to perform an interrogation operation while lead 89–1 enables AND gates 73–1 and 73–2 only during the performance of an interrogation operation.

72 designates a multi-match disposal circuit which is comprised of a plurality of flip-flop circuits (not shown) each of which is set by means of an output signal from the AND gates 73–1 and 73–2 and is thereby employed for storing a match condition. The multi-match disposal circuit is further comprised of logical circuitry (to be more fully described) which produces selective signals in a sequential manner in accordance with the set state of the plural flip-flops to cause sequential read out of matched words in a manner to be more fully described.

Word driving circuits 76–1 and 76–2 are operated by the multi-match disposal circuit 72 for readout of all words contained on their associated row, as will be more fully described. Amplifiers 78–1 and 78–2 amplify data read out from words in associated columns. Bus lines 83–1 and 83–2 connect the data read out from words of associated columns to the amplifiers 78.

Detectors 77–1 and 77–2 detect a matching (or mismatching) condition between data signals read out from selected memory cells and associated interrogation signals to develop either a match (non-suppress) signal or a mismatch (suppress) signal. The bus lines 85–1 and 85–2 apply the readout signals which have been amplified to their associated detector circuits 77. Suppressor circuits 80–1 and 80–2 are provided for preventing the readout data from being fed to utilization circuits (not shown) when the readout data is not derived from matched words. The bus lines 93–1 and 93–2 couple the output of the suppressor circuits to the utilization circuitry (not shown).

Let it first be assumed that an interrogation operation is being performed in order that the data of words which match with interrogation signals may be obtained from memory. In order to perform this operation, interrogation signals are applied to bus line 82–1 simultaneously with control signals being applied to the interrogation control leads 89–1 through 89–3. The interrogation signals applied to bus line 82–1 are impressed upon driving circuits 71–1 and 71–2, respectively, through the bus lines 82–2 and 82–3 whereby the interrogation signals appear at selected output terminals of the driving circuits 71–1 and 71–2. These signals, in turn, are applied to associated interrogation signal terminals 63–1 through **63–*n* and 64–1 through 64–*n* of the words 60. Driving circuit 71–1 simultaneously interrogates words 60–1 and 60–3, while driving circuit 71–2 simultaneously interrogates words 60–2 and 60–4**.

Figure 5:
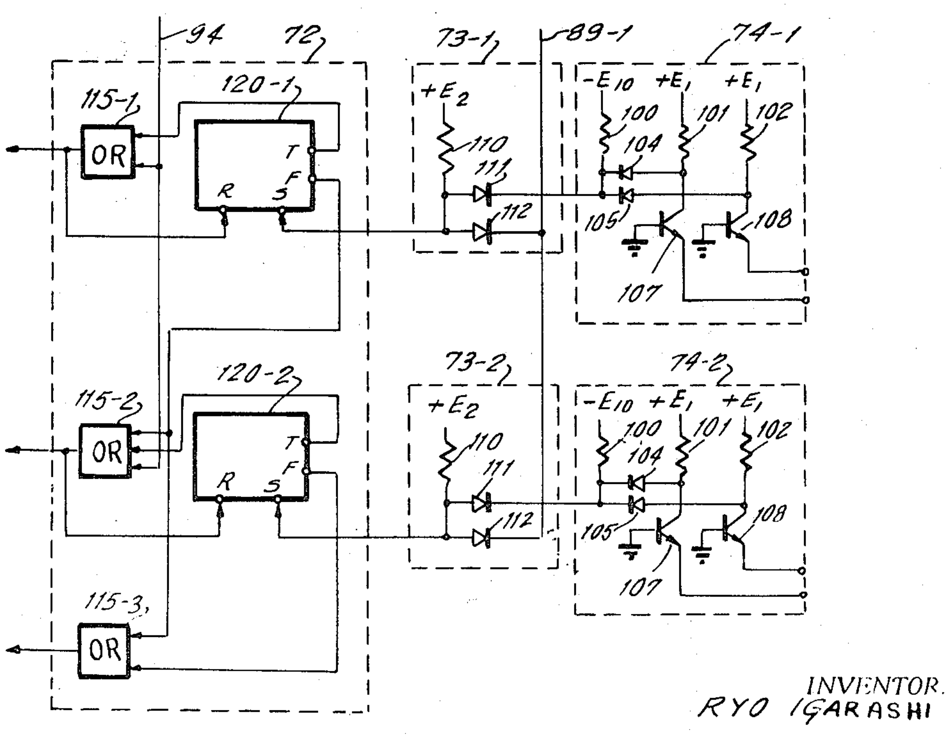
FIG. 5 is a block diagram showing the logical circuits for detecting matched signals and the multi-match disposal circuit contained in FIG. 4 in greater detail.

In the case where any of the words in memory match the interrogation signals, a match signal is obtained at the terminal 61 from either or both of the words of the interrogated rows. If a match signal is developed by either of the words, OR gate 74–1 passes this state to AND gate 73–1 which is enabled to pass a match signal by enabling line 89–1 which is in this state during an interrogation operation. The match signal is applied to an associated flip-flop (to be more fully described) contained in disposal circuit 72 for the purpose of storing the presence of a matched condition. In a similar manner, the flip-flops (not shown) provided for the words 60–3 and 60–4 store the presence of a match state by means of match signals appearing at either or both of the terminals 61 which are, in turn, passed by OR gate 74–2 and AND gate 73–2 to the disposal circuit 72. In the embodiment shown in FIG. 4. two flip-flops are provided for storing the matched condition. FIG. 5 shows the manner in which the flip-flops are set by the signals fed from OR gates 74 and AND gates 73, as well as a description of the manner in which multiple matches are handled by the disposal circuitry.

Figure 6:
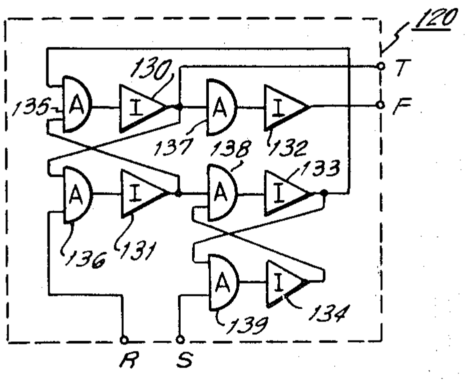
FIG. 6 is a logical diagram of a flip-flop circuit which may be used in the multi-match disposal circuit of FIG. 5.

FIG. 5 shows the OR gates 74 and the AND gates 73 in schematic fashion whereas the flip-flops 120–1 and 120–2 employed in the disposal circuitry 72 for storing a match condition, are shown in block diagram form. Reference should thereby be made to FIG. 6 which shows the logical arrangement of a flip-flop 120. Referring to the arrangement of each of the flip-flops 120 as shown in FIG. 6, each flip-flop is comprised of AND gates 135 through 139 and inverter circuits 130–134. For the convenience in understanding the operation of the flip-flop, a binary "1" state will be identified as a zero voltage level, while a binary "0" state will be identified as a +2 volt state. The normal state of the flip-flop 120 of FIG. 6 will be that in which the terminals R (reset terminal) and S (set terminal) are normally held respectively, at the binary "0" and binary "1" states. The terminal R is employed for the purpose of applying a reset signal, while the terminal S is used for setting the flip-flop in accordance with the presence of a match signal. When the inverters 130 and 132 have their output terminals at the "0" and "1" states respectively, and if the state of terminal S is varied from "1" to "0" during the time period from $t_1$ to $t_2$, as shown by waveform 141 of FIG. 7, then the output of AND gate 139 becomes "0," and the output of inverter 134 is "1." More specifically, just prior to the application of the pulse 141 to set terminal S, the output states of AND gates 135–139 are "1," "0," "0," "0," and "1"; while the output levels of inverters 130–134 are "0," "1," "1," "1," and "0," respectively. The application of pulse 141 thereby momentarily alters the state at terminal S to "0" causing the output of AND gate 139 to go to "0"; and the output of inverter 134 to go to "1"; and the output of AND 138 to go to "1"; the output of inverter 133 to go to "0"; and the output of AND gate 135 to go to "0"; and the output of inverter 130 to go to "1" and the outputs of AND gate 137 and inverter 132 to go to "1" and "0," respectively.

Since terminal R is maintained in the "0" state during the interval from $t_1$ to $t_2$, the outputs of AND gate 136 and inverter 131 are "0" and "1," respectively. Hence, the outputs of AND gate 138 and inverter 133 respectively become "1" and "0" as was described above. In addition thereto, owing to the "0" output of inverter 133, the outputs of AND gate 135 and inverter 130 are respectively "0" and "1." Considering the outputs of inverters 130 and 132 at the end of the pulse 141 applied during time interval $t_1$–$t_2$, although the state of terminal S is returned to "1," the respective outputs of AND gate 139 and inverter 134 do not change owing to the "0" output state of inverter 133. For this reason, no variation occurs in the outputs of inverters 130 and 132 whose output terminals T and F are employed to couple matching signal information to subsequent logic circuits in the disposal circuit 72. Summarizing, the application of a pulse 141 to terminal S causes the flip-flop to be set to a condition where terminals T and F are maintained at the "1" and "0" states, respectively.

Figure 7:
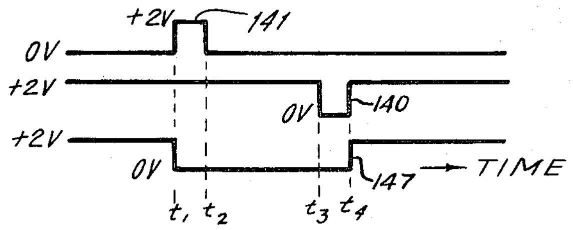
FIG. 7 is a plot showing a plurality of waveforms useful in explaining the operation of the flip-flop circuit of FIG. 6.

Let it now be considered that a pulse 140, shown in FIG. 7, is applied to terminal R of FIG. 6 to alter the level there from "0" (+2 volts) to "1" (0 volts) during time period $t_3$–$t_4$. This causes the outputs of AND gate 136 and inverter 131 to assume "1" and "0" states, respectively, as a result of the logical product of "1" appearing at the output of inverter 130 and the "1" state applied to terminal R. The "0" output of inverter 131 causes the outputs of AND gate 138 and inverter 133 to become "0" and "1," respectively, resulting in the outputs of AND gate 139 and inverter 134 becoming "1" and "0," respectively. As a result of the pulse applied to terminal R, as described above, the output of inverter 131 is changed from "1" to "0." Also, the output of inverter 133 is changed from "0" to "1." However, since one of the two inputs to AND gate 135 is in the "0" state, the output of inverter 130 is held at the "1" state. Similarly, when the output of inverter 130 is held at the "1" state, the output of inverter 132 is held at the "0" state. Therefore, even when the state of terminal R is changed from "0" to "1" during the period $t_3$–$t_4$, the state of the outputs of inverters 130 and 132 is not changed.

Immediately after time $t_4$ pulse 140 is removed from terminal R returning the terminal to the "1" state. The output of AND gate 136 is thus changed from "1" to "0," and the output of inverter 131 is altered from "0" to "1." However, the output of inverter 133 is maintained at "1" since the remaining input terminal of AND gate 138 is at "0." Thus, the output of AND gate 135 is varied from "0" to "1," and the output of inverter 130 from "1" to "0," while the output of inverter 132 is altered from "0" to "1." As is clear from the above explanation, it can be seen that the output of inverter 130 is set at "1" by the leading edge of a pulse applied to terminal S and is reset to "0" owing to the trailing edge of a pulse 140 applied to terminal R. The state of the terminal 130 from $t_1$–$t_4$ is shown by waveform 147.

The flip-flop used in one embodiment of the present invention is characterized by the state of the terminals T and F being constant during the period in which a pulse is being applied for the reset operation, which is clearly shown by waveform 147 in which reset does not occur until the trailing edge of the reset pulse has occurred.

An explanation will now be given with respect to FIG. 5 which carries like reference numerals for like elements, as compared with FIGS. 4 and 6.

Each of the OR gates 74–1 and 74–2 is comprised of a solid state circuit including an NPN transistor 107 having a collector connected to positive bias means through a resistor 101. Voltage variation is applied to the emitter terminal in the presence of a mis-match signal (which is obtained from its associated memory word when a mis-match between the interrogation signal and the stored contents of the word exists). NPN transistor 108 is coupled to a positive bias source through resistor 102 and receives a current variation at its emitter as a result of a mis-match of its associated word with the interrogation signals. The output signals are taken from the collectors of transistors 107 and 108 and applied to diodes 104 and 105, respectively, which, together with resistor 100, form an OR gate.

Each of the AND gates 73–1 and 73–2 is comprised of a resistor 110 coupled with a first end to positive potential and having the anodes of diodes 111 and 112 coupled in common to its other terminal for controlling the output according to the logical product of the output from its associated OR gate 74 and the control signal derived from the interrogation control lead 89–1, also shown in FIG. 4.

The multi-match disposal circuit 72 is comprised of flip-flops 120–1 and 120–2 and the logical circuits, namely, OR gates 115–1 through 115–3. When the circuits of FIG. 5 are in their normal state (i.e. when an interrogation operation is not being performed) no current flows from the transistors 107 or 108 to their corresponding word match terminals. In this state, transistors 107 and 108 are maintained in the OFF condition. With the transistors in the OFF state, positive voltage ($+E_1$) is applied to the lower terminal of resistor 100 through diodes 104 and 105. The negative voltage level ($-E_{10}$) applied to one terminal of resistor 100, the positive voltage level ($+E_1$) applied to resistors 101 and 102 and the values of resistors 100–102 are all selected so that the potential at the common terminal of diodes 104 and 105 will be at least as great as +2 volts which is hereinafter referred to as a "1" state. The state of the interrogation control lead 89–1 is maintained at zero volts, hereinafter referred to as a "0" state. Accordingly, the flip-flops 120–1 and 120–2 contained in the multi-matched disposal circuit 72 have their respective set terminals S maintained at "0" because of the conductivity of the diodes 112 in each of the AND gates 73–1 and 73–2.

As was previously described with regard to flip-flop 120 in FIG. 6, the zero volt level corresponds to binary "1" and the +2 volt level corresponds to "0." However, in the explanation with regard to FIG. 5, the zero level is assumed to correspond to "0" and +2 volts corresponds to "1." However, if one realizes that flip-flop 120 is set by temporarily changing the potentials at the set terminals to +2 volts from zero volts, no misunderstanding will occur with regard to the subsequent explanation. Therefore, for purposes of the ensuing explanation the zero volt level corresponds to a "0" state and the +2 volt level corresponds to a "1" state.

During the interrogation operation the state of interrogation control lead 89–1 is changed from "0" to "1." The values of voltages $+E_1$, $-E_{10}$ and $+E_2$ (applied to AND gate 73) and the values of resistors 100–102 and 110 are selected so that the potential at the output end of OR gate 74–1 becomes at least +2 volts when a current from a word, owing to the absence of a mis-match signal, is not applied to the emitter of either transistor 107 or 108 contained in OR gate 74–1 and, further so that the potential at the output end of OR gate 74–1 is zero volts when the current from each of the words, owing to the presence of mis-match signals, is applied to each emitter of transistors 107 and 108.

As is clear from the preceding explanation, when the contents of the selected cells of each word 60–1 and 60–2 match with the interrogation signals, or in the case where the contents of selected cells of either word 60–1 or 60–2 match with interrogation signals, the potential at the output end of OR gate 74–1 is at least +2 volts. At the same time, the output end of AND gate 73–1 moves to the "1" state owing to the control signal applied to interrogation control lead 89–1. Sumarizing, it can be seen that when both transistors 107 and 108 are OFF, a positive level appears at the common terminal between the cathodes of diodes 104 and 105. If either transistor 107 or 108 or both of them conduct, a negative or appreciably lower potential level is applied to the cathode of diode 111. This results in a binary "1" state at AND gate 73–1 causing flip-flop 120–1 to be set so that the potentials at its terminals T and F are zero volts and +2 volts, respectively. In a similar manner, flip-flop 120–2 will be set owing to a match signal being generated from either or both of the memory words 60–3 and 60–4. In other words, when flip-flops 120–1 and 120–2 are in the set state to store a match condition, the terminals T and F are "0" and "1," respectively. Assuming that both flip-flops are in a set state after performance of the interrogation operation, the selection operation of matched words which is performed in a sequential fashion in conjunction with flip-flops 120–1 and 120–2, is initiated when a pulse train is applied to control lead 94 causing the state of the control lead to change from its normal "1" state to the "0" state. When the first pulse is fed to control lead 94, two inputs of OR gate 115–1 are both at "0" causing the output of OR gate 115–1 to go from "1" to "0." Since terminal F of flip-flop 120–1 is in the "1" state, this terminal maintains the outputs of OR gates 115–2 and 115–3 at "1." Thus the outputs of OR gates 115–2 and 115–3 are not changed. When the output of OR gate 115–1 is changed from "1" to "0," this state causes word driving circuit 76–1 to be actuated to cause a selection (i.e. readout) of words 60–1 and 60–2. The selection of words 60–1 and 60–2 will be terminated as soon as the first pulse applied to control lead 94 is terminated. When the first pulse applied to control lead 94 is removed and the state of control lead 94 is restored to "1" and when the "0" output state of OR gate 115–1 is restored to the "1" state, flip-flop 120–1 is switched from the set state to the reset state in the same manner as was previously described with respect to FIGS. 6 and 7 (i.e. after the termination of the control pulse which may be considered to be the pulse 140 of FIG. 7). The instant that flip-flop 120–1 has switched back to the reset state, the state of terminal F is changed from "1" to "0."

When the next pulse is applied to control lead 94, the output state of OR gate 115–1 and of OR gate 115–3 is maintained at "1," while the output of OR gate 115–2 is changed from "1" to "0." As a result of the "0" output state of OR gate 115–2, word driving circuit 76–2 is actuated causing the words 60–3 and 60–4 to be brought into a selective state for readout. The instant that the second pulse is removed from control lead 94, the selective operation of words 60–3 and 60–4 is terminated and the state of terminal F of flip-flop 120–2 is switched from "1" to "0." This causes the output of OR gate 115–3 to change from "1" to "0" which indicates a conclusion in the selective state of all of the words, i.e. which indicates that all rows containing at least one matched word have sequentially been driven to the selective state for readout purposes. The above explanation was given for the case where both flip-flops 120–1 and 120–2 are in the set state. It should be noted, however, that when the flip-flop 120–2 is in the set state and 120–1 is in the reset state, words 60–3 and 60–4, as shown in FIG. 4, are driven to the selective state under control of the first pulse applied to control lead 94 and the "0" output of OR gate 115–3 which is detected as soon as the first pulse applied to control 94 is terminated indicating the presence of a match condition in only one row. In this manner, the driving circuit 76–2 is actuated and, at the time of readout, the control leads 88–1 and 88–2, shown in FIG. 4, which control write-in and readout operation are placed in the readout state, i.e. that state where the write-in circuits 79–1 and 79–2 are prevented from operating even though write-in information may be applied to these circuits through bus 90–1 and lines 90–2 and 90–3, respectively.

As can be seen from the foregoing description, in the case where word 60–2 matches the interrogation signals and word 60–1 does not match, flip-flop 120–1 is nevertheless set and, in the succeeding selective operation both words 60–1 and 60–2 are set in the selective state owing to the set state of flip-flop 120–1. As a result of this operation, means must be provided for preventing the mismatched word 60–1 from being fed to utilization circuitry. The signals for suppressing the data read out from the word in the mis-match state are generated by detection circuitry 77–1 and 77–2 provided for each respective column in the associative memory. These suppression signals are applied through the signal leads 87–1 and 87–2 to suppression circuits 80–1 and 80–2, to be more fully described. For example, the suppression signal from detector 77–1 is applied to suppression circuit 80–1 and prevents the readout of data fed through readout amplifier 78–1 from being fed to the bus line 93–1.

Figure 8:
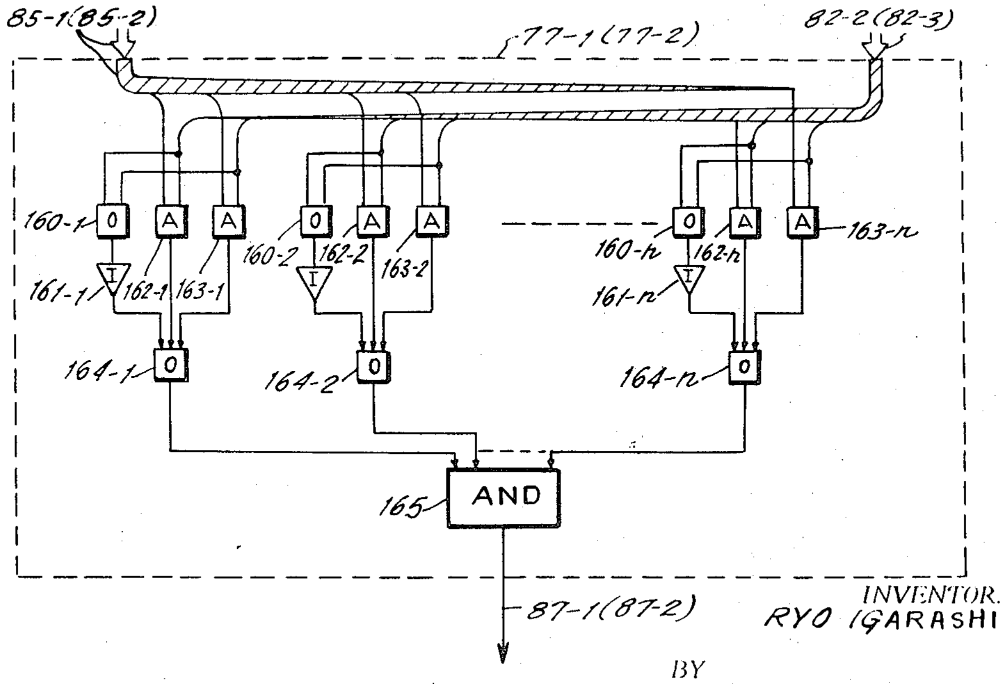
FIG. 8 is a logical diagram showing the detection circuits employed for generating signals to suppress readout and wrtie-in operations of mismatched words.

The logical circuitry of detection circuit 77–1 is shown in FIG. 8. It should be understood that detection circuit 77–2 is identical in both operation and design. The numerals in parenthesis indicate those incoming signals and those outgoing signals which will be received and generated respectively, for the words 60–2 and 60–4. The circuitry is comprised of OR gates 160–1 through **160–*n*, for detecting associative memory cells to which interrogation signals are not applied. Inverter circuits 161–1 through 161–*n* are connected to the outputs of OR gates 160–1 through 160–*n*, respectively, for inverting their output states. Bus line 85–1 couples the readout data from amplifier 78–1; bus line 82–2 couples the interrogation signals to the detection circuit. AND gates 162–1 through 162–*n*** are provided for producing outputs when associated interrogation signals applied to selected ones of the *n* storing positions of a word and the associated readout data from the stored positions are both in a binary "1" state. AND gates 163–1 through **163–*n* are provided to produce an output when the interrogation signals and the associated stored bits are both in a binary "0" state. OR gates 164–1 through 164–*n* receive the outputs of inverters 161–1 through 161–*n*, respectively, AND gates 162–1 through 162–*n*, respectively, and AND gates 163–1 through 163–*n*, respectively, to generate an output indicating the presence of a binary "1" at any one of its three input terminals. AND gate 165 generates a binary "1" output when all of its input terminals coupled to OR gates 164–1 through 164–*n*** are in binary "1" state.

As one example, the associative memory cells 30–2 (see FIG. 3) contained in words 60–1 and 60–3 are applied to OR gate 160–2 and AND gate 162–2 and 163–2 in sequential fashion. Let is be assumed that no interrogation signals are applied to the memory cells 30–1 of words 60–1 and 60–3 in sequential fashion, then OR gate 160–1 will have applied thereto a "0" state from the interrogation lead and a "0" state from the associated memory cell terminal 65–1. This results in a "0" state appearing at the output of OR gate 160–1 which is converted to a "1" state by inverter 161–1. This means that the ouput of OR gate 164–1 will be "1" regardless of the states of the AND gates 162–1 and 163–1. In the case where the "1" interrogation lead included in the bus lines 82–2 whole lead is provided for the associative memory cell 30–2 of the word 60–1, is in a "1" state and when the stored contents of the memory cell is "0" then the ouputs of OR gate 160–2 and the inverter 161–2 are respectively, "1" and "0." In this case, a "0" readout from the memory cell develops a "1" state at one input of AND gate 163–2 through the "0" read line included in bus line 85–1. However, the other terminal of AND gate 163–2 which constitutes the "0" interrogation lead is maintained in the "0" state so that the output of AND gate 163–2 becomes "0." Further, a "0" state stored in associative memory cell 30–2 of word 60–1 supplies a "0" state to on of the inputs of AND gate 162–2 through a "1" read line contained in bus line 85–1, causing the output of AND gate 162–2 to be "0." This means that each output of OR gate 164–2 and AND gate 165 will be "0."

When the associative memory cell **30–*n* of word 60–1 is assumed to be in the "0" state and when the "0" interrogation lead for the associative memory cell 30–*n* is in the "1" state, then the output of AND gate 163–*n* will be "1." When the associative memory cell 30–*n* of the word 60–1 is in the "1" state and when a "1" interrogation lead from the memory cell is in the "1" state, the output of AND gate 162–*n*** will be "1."

Summarizing, it can be seen that the OR gate 160 for each memory position is employed to determine the presence of interrogation signals at each memory position; AND gate 162 is provided to determine the simultaneous presence of a binary "1" interrogation signal and a binary "1" memory state for the associated cell and AND gate 163 is provided for the purpose of determining the simultaneous presence of a binary "0" interrogation signal and a binary "0" memory state in the associated cell. In short, even if only one associative memory cell in a word does not match with an interrogation signal, then the output of detection circuit 77 appearing at terminal 87–1 is "0" when the word is selected. The output of detection circuit 77 provided for that word becomes "1" when the presence of a matched word is detected. Accordingly, when the output of detection circuit 77–1 is "0," the readout data applied from amplifier 78–1 to suppression circuit 80–1 is prohibited from reaching the bus line 93–1.

Since the detection circuit 77–2 has been indicated as being similar in design and operation to detection circuit 77–1, an explanation of its operation will be omitted herein for purposes of simplicity.

The detection circuits 77–1 and 77–2 determine whether the readout data applied to amplifiers 78–1 and 78–2 have been derived from matched words in order to determine whether or not the readout data should be applied to suitable utilization circuitry.. It can thus be seen that words 60–1 and 60–2 can be placed in the selected state simultaneously and can be simultaneously read out if they are detected as being matched words. Thus, when the word 60–1 matches with interrogation signals and when the word 60–2 does not, then the stored contents of word 60–1 will be read out, while the stored contents of words 60–2 will be suppressed from readout. In the case when both words 60–1 and 60–2 match with the interrogation signals, the stored contents will be read out simultaneously. A description of match words into which data are written will now be given. It is assumed that the control leads 88–1 and 88–2, shown in FIG. 4, employed for both write-in and readout, are placed in the write-in state. The interrogation signal is held in bus line 82–1 until another interrogation signal is applied after data has been written into a word which matches with the present interrogation signal. The writing mode of the data is roughly classified into two categories; one in which the stored contents of a selected portion, i.e. the stored contents of a portion to which interrogation signals are applied are left as they are, and the data is written into the remaining portion; and the other category in which data is written into all portions inclusive of the selected portion of the word.

Let it first be considered that the stored contents of a selected portion of a word are left as they are and the data is written into the remaining portion of the interrogated word. The detection of matched words is performed in the same manner as for the reading operation previously described. Thus, the flip-flops 120–1 and 120–2 provided for storing the match state of words with interrogation signals, are driven to the set state and then the matched words are selected in sequence by means of pulses sequentially applied to control lead 94. If the word 60–1 matches with interrogation signals and the word 60–2 fails to match with interrogation signals, it is necessary to prevent the word 60–2 from being furnished with write-in data. Although not illustrated in FIG. 4, when the words 60–1 and 60–2 are both selected, the stored contents of a selected portion to which the interrogation signals has been applied are held as they are, and then the output of the detection circuit 77–2 for the word 60–2 becomes "0" while the output of detection circuit 77–1 for the word 60–1 becomes "1." The potential variation corresponding to write-in data is produced at respective outputs of the writing circuit 79–1 while the potential variation is not produced at the respective outputs of writing circuit 79–2. Thus, the data is only written in to word 60–1 while write-in is prohibited for word 60–2 even though it is held in the selected state. Summarily, in the case where write-in is not performed at a selected portion to which interrogation signals are applied, the control signal is applied to the interrogation control leads 89–1, 89–2 and 89–3 simultaneously, in a manner similar to the reading operation and the match words are detected. The two words will then simultaneously be placed in a selected state and write-in will be carried out only for that word which matches with the interrogation signals. However, when the two words match with the interrogation signal, write-in is carried out simultaneously for both words.

An explanation will now be given for the case where data is written into all memory cells including the portion to which interrogation signals are applied. When the two words of an associated row are brought into a selective state, the detection circuits 77–1 and 77–2 for the words are driven to either "0" or "1" as a result of the words being placed in a reading state. Although not shown in FIG. 4, separate flip-flop circuits are provided for detection circuits 77–1 and 77–2. These flip-flops respond at the leading edge of the selective signal to the output state of the respective detection circuits 77–1 and 77–2 and remain intact until the selective signal is removed. In addition thereto, the outputs of the flip-flops control the write-in circuits 79–1 and 79–2 so that the data may be written. In other words, since the cells which were used for detecting the matched word are supplied with new data, the output of the detection circuit 77–1 and circuit 77–2 may be subject to change. Thus, if the writing circuits 79–1 and 79–2 were directly controlled by the output of the detection circuits 77–1 and 77–2, a disturbance would occur in the memory positions being interrogated for a word which matches the interrogation signals. Therefore, by temporarily placing the two words in the state of being read owing to the leading edge of the selective signal, the matched words are detected in advance with the detection circuits 77–1 and 77–2 and the results are stored in the flip-flop circuits FF, as shown in FIG. 4. During the period that the selective signal continues, the outputs of the write-in circuits 79–1 and 79–2 which are under control of the flip-flops, undergo potential variation due to the write-in data permitting the performance of the write-in operation.

The above description has been directed to FIG. 4 which shows one preferred embodiment of the present invention. In the case where each column is comprised of two words and each row is comprised of two words, it is sufficient to provide two driving circuits and two flip-flops for storing the matching signals in the disposal circuitry. In associative memories provided with a larger word capacity, the number of word driving circuits and flip-flops provide for storing the matching signal can be reduced to one-half the total number of words, resulting in an economical arrangement in which operating time is still reduced due to the fact that all words of a row may be driven simultaneously during an interrogation operation. In general, by arranging M words in each column and N words in each row, the number of word driving circuits and the number of flip-flops employed for storing the matching signals can be reduced to $1/M$ as compared with associative memories heretofore in use and similarly the operating speeds can be increased by nearly N times.

Although there has been described a preferred embodiment of this novel invention, many variations and modifications will now be apparent to those skilled in the art. Therefore, this invention is to be limited, not by the specific disclosure herein, but only by the appending claims.

What is claimed is:

1. An associative memory system comprising a plurality of word storage means each being comprised of a plurality of memory cells;

each of said memory cells including first means for storing a bit of binary information;

said word storage means being arranged in M columns and N rows forming an M by N memory word capacity;

means for simultaneously interrogating selected memory cells of all of said columns to determine the presence of a match or mismatch condition between the interrogation signals and the associated memory cells of the interrogated words;

each of said memory cells further including second means for generating a match signal when the interrogation signal applied thereto matches the stored binary state of the memory cell interrogated;

each of said word storage means including a lead connected in common to all of the second means of its associated memory cells;

bistable storage means for each row of said memory system for storing a match signal when at least one word of its associated row generates a match signal;

gating means assigned to each row in the memory system for coupling all of the leads of its associated row to its associated bistable storage means;

third means assigned to each row of the memory system coupled between its associated word storage means and bistable storage means for reading out the stored contents of all words in its assigned row when the associated bistable storage means stores a match signal condition for that row;

plural detection means assigned to each column in the memory system for receiving the interrogation signals from said interrogating means and for receiving the data read out from the word storage means in its associated column under control of said third means for detecting a match between the interrogation signals and the data read out from the associated word storage means;

each of said detection means including means for generating a suppression signal when a mismatch is present between at least one interrogation signal and associated memory cell state occurs;

plural output means for transfering a matched word in memory to its output terminals being controlled by the detection circuit assigned to its column including means for preventing the transfer of data to its output terminals in the presence of a suppression signal.

2. The system of claim 1 further comprising a multimatch disposal circuit coupled to all of said bistable storage means for sequentially energizing said third means to couple each row to read out storage contents of the word storage means in each row of the memory to the detection circuit for its associated column on a row-by-row basis.

3. The associative memory system of claim 2 further comprising means for selectively writing data into all of the word storage means of each row of said memory;

each of said memory cell means being capable of changing its bistable state under control of an associated write-in signal when its associated third means is energized.

4. The system of claim 2 wherein said disposal circuit is further comprised of means for sequentially applying a reset signal to each bistable storage means for removing the match state from each bistable storage means in sequential fashion as the third means associated with said bistable storage means drives its associated word storage means into the readout state.

5. The associative memory system of claim 4 wherein each of said bistable storage means is comprised of means for delaying removal of the matched condition until the reset signal is terminated to permit only one bistable storage means to be reset at any given instant.

6. The associative memory system of claim 3 wherein said detection circuit is coupled to an associated write-in circuit to prevent a write-in operation from being performed upon a word storage means in the row being activated by its associated third means when the word storage means fails to generate a match signal.

7. The associative memory system of claim 6 further comprising plural delay means coupled between each detection circuit and an associated write-in circuit to prevent said suppression signal from disabling its associated write-in circuit as a write-in operation is performed.

References Cited

UNITED STATES PATENTS 3,402,398 9/1968 Koerner et al. ------- 340—173

TERRELL W. FEARS, Primary Examiner

U.S. Cl. X.R.

307—238, 279; 328—206

UNITED STATES PATENT OFFICE
CERTIFICATE OF CORRECTION

Patent No. 3,551,899 Dated December 29, 1970

Inventor(s) Ryo Igarashi

It is certified that error appears in the above-identified patent and that said Letters Patent are hereby corrected as shown below:

Column 1, after line 5 and before line 6, insert the following:

-- Claims priority based on Japanese Application Serial No. 78,537, filed November 29, 1966. -- line 69, the word "hereinafter should be -- hereinabove --;

Column 3, line 26, the word "wrtie" should be -- write --;

Column 6, line 52, ",," should be -- , --;

Column 7, line 45, the word "terminals" should be -- terminal --;

Column 12, line 7, after "zero" insert -- volt --;

Column 14, line 14, the word "is" should be -- it --;
line 25, the word "whole" should be -- whose --;
line 38, the word "on" should be -- one --

Signed and sealed this 14th day of September 1971.

(SEAL)
Attest:

EDWARD M.FLETCHER,JR.
Attesting Officer

ROBERT GOTTSCHALK
Acting Commissioner of Pate